US012744317B2

(12) United States Patent
Hoshino et al.

(10) Patent No.: US 12,744,317 B2
(45) Date of Patent: Sep. 22, 2026

(54) ELECTROMAGNETIC WAVE CONTROL ELEMENT

(71) Applicant: FUJIFILM Corporation, Tokyo (JP)

(72) Inventors: Wataru Hoshino, Kanagawa (JP); Yukito Saitoh, Kanagawa (JP); Taketo Otani, Kanagawa (JP); Hideki Yasuda, Kanagawa (JP); Makoto Shimizu, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 28 days.

(21) Appl. No.: 19/077,844

(22) Filed: Mar. 12, 2025

(65) Prior Publication Data

US 2025/0210863 A1 Jun. 26, 2025

Related U.S. Application Data

(63) Continuation of application No. PCT/JP2023/034822, filed on Sep. 26, 2023.

(30) Foreign Application Priority Data

Sep. 27, 2022 (JP) ................................ 2022-153527

(51) Int. Cl.
*H01Q 3/46* (2006.01)

(52) U.S. Cl.
CPC .................................... *H01Q 3/46* (2013.01)

(58) Field of Classification Search
CPC .. H01Q 1/38; H01Q 3/44; H01Q 3/46; H01Q 1/526; H01Q 19/10; H01Q 15/14; G02F 1/13306
See application file for complete search history.

(56) References Cited

U.S. PATENT DOCUMENTS 6,552,696 B1 4/2003 Sievenpiper et al.
2021/0408681 A1* 12/2021 Suzuki .................... H01Q 1/38
2022/0037785 A1 2/2022 Okita

FOREIGN PATENT DOCUMENTS

JP 2003-529259 A 9/2003
JP 2022-025914 A 2/2022
JP 2022-075534 A 5/2022

OTHER PUBLICATIONS

International Search Report Issued in PCT/JP2023/034822 on Dec. 12, 2023.
Written Opinion Issued in PCT/JP2023/034822 on Dec. 12, 2023.
International Preliminary Report on Patentability Issued in PCT/JP2023/034822 on Mar. 1, 2025.
Jingbo Wu et al., Liquid crystal programmable metasurface for terahertz beam steering, Appl. Phys. Lett. Mar. 31, 2020, p. 131104, 116.

* cited by examiner

*Primary Examiner* — Jimmy T Vu
(74) *Attorney, Agent, or Firm* — Edwards Neils LLC; Jean C. Edwards, Esq.

(57) ABSTRACT

An electromagnetic wave control element having a small variation in reflectivity of electromagnetic waves in the plane. The electromagnetic wave control element is configured to have, in the following order, a metasurface member including a metasurface structure in which a plurality of microstructures are arranged, an interlayer disposed in contact with the metasurface member, and a liquid crystal film that is disposed in contact with the interlayer and includes a liquid crystal layer in which an alignment of a liquid crystal compound is immobilized.

16 Claims, 5 Drawing Sheets

ELECTROMAGNETIC WAVE CONTROL ELEMENT

CROSS-REFERENCE TO RELATED APPLICATIONS

This application is a Continuation of PCT International Application No. PCT/JP2023/034822 filed on Sep. 26, 2023, which was published under PCT Article 21(2) in Japanese, and which claims priority under 35 U.S.C. § 119(a) to Japanese Patent Application No. 2022-153527 filed on Sep. 27, 2022. The above applications are hereby expressly incorporated by reference, in their entirety, into the present application.

BACKGROUND OF THE INVENTION

1. Field of the Invention

The present invention relates to an electromagnetic wave control element using a metasurface structure.

2. Description of the Related Art

High-frequency radio waves (millimeter waves, terahertz waves) required for high-capacity wireless communication have high straightness. Therefore, for example, in order to deliver radio waves to the entire area in a room, a reflective plate that is attached to a wall or the like and bends radio waves in any direction is required.

However, a typical reflective plate exhibits specular reflection, and the incidence angle and the emission angle are equal. Therefore, for example, there was a problem that radio waves have difficulty reaching places such as the back of a room.

In contrast, a device that bends electromagnetic waves in a direction different from specular reflection using a dynamic element such as a liquid crystal is also disclosed.

For example, Jingbo Wu et al., Liquid crystal programmable metasurface for terahertz beam steering, Applied Physics Letters, 116, 131104 (2020) describes an electromagnetic wave control element (beam steering element) in which a liquid crystal layer 104 is interposed between a metasurface structure 100 and an electrode layer 102, as conceptually shown in FIG. 8.

In the electromagnetic wave control element shown in FIG. 8, the metasurface structure 100 is formed by arranging microstructures 100*a* serving as resonators, as in a known metasurface structure.

In this electromagnetic wave control element, the microstructures 100*a* constituting the metasurface structure 100 act not only as reflectors but also as electrodes. That is, the microstructures 100*a* and the electrode layer 102 constitute an electrode pair.

In addition, the electrode layer 102 also acts as a reflective layer of the incident electromagnetic waves.

The liquid crystal layer 104 is, as an example, formed by aligning the liquid crystal compound LC. In the example shown in FIG. 8, the liquid crystal compound LC is, as an example, a rod-like liquid crystal compound.

In the electromagnetic wave control element, in a state where no voltage is applied between the microstructures 100*a* and the electrode layer 102, the liquid crystal compound LC is aligned such that the longitudinal direction, that is, the direction of the optical axis coincides with the thickness direction.

In a case where a voltage is applied between the microstructures 100*a* and the electrode layer 102 in this state, the alignment state of the liquid crystal compound LC changes depending on the magnitude of the applied voltage.

In the example shown in the drawing, as an example, the liquid crystal compound LC is tilted with respect to the thickness direction depending on the magnitude of the voltage applied between the microstructures 100*a* and the electrode layer 102.

In FIG. 8, as an example, a high voltage is applied to the microstructure 100*a* on the left side in the drawing and a low voltage is applied to the microstructure 100*a* on the right side in the drawing. As a result, the liquid crystal compound LC located in a region of the microstructure 100*a* on the left side in the drawing is largely tilted and the longitudinal direction is at an angle close to the main surface of the liquid crystal layer 104. On the other hand, the tilt of the liquid crystal compound LC located in a region of the microstructure 100*a* on the right side in the drawing is small and the longitudinal direction is at an angle close to the thickness direction of the liquid crystal layer 104.

The refractive index of the liquid crystal layer 104 increases as the tilt of the liquid crystal compound LC increases, that is, as the angle of the longitudinal direction of the liquid crystal compound LC is closer to a surface of the liquid crystal layer 104. Conversely, as the tilt of the liquid crystal compound LC decreases, that is, as the angle of the longitudinal direction of the liquid crystal compound LC is closer to the thickness direction of the liquid crystal layer 104, the refractive index of the liquid crystal layer 104 decreases.

Accordingly, in this state, the refractive index of the liquid crystal layer 104 is large in the region of the microstructure 100*a* on the left side in the drawing where the tilt of the liquid crystal compound LC is large, and is small in the region of the microstructure 100*a* on the right side in the drawing where the tilt of the liquid crystal compound LC is small.

Therefore, in the region of the microstructure 100*a* on the left side in the drawing where the refractive index is large, the phase of the incident electromagnetic waves is largely changed, as compared with the region of the microstructure 100*a* on the right side in the drawing where the refractive index is small.

As a result, in the region of the microstructure 100*a* on the left side in the drawing, the optical path of the electromagnetic waves is apparently long, as compared with the region of the microstructure 100*a* on the right side in the drawing.

Accordingly, in a case where electromagnetic waves are incident from the normal direction of the liquid crystal layer 104, even in electromagnetic waves that are simultaneously incident, the emission of electromagnetic waves incident on the region of the microstructure 100*a* on the left side in the drawing where the optical path length from the reflecting device is long is later than that of electromagnetic waves that are incident on the region of the microstructure 100*a* on the right side in the drawing where the optical path length is short.

As a result, electromagnetic waves incident from the normal direction into the reflecting device and reflected from the reflecting device are reflected to be tilted toward the left side such that wavefronts thereof are aligned instead of being specularly reflected in the normal direction.

SUMMARY OF THE INVENTION

In the electromagnetic wave control element described in Jingbo Wu et al., Liquid crystal programmable metasurface for terahertz beam steering, Applied Physics Letters, 116, 131104 (2020), the alignment of a liquid crystal compound constituting the liquid crystal layer is not immobilized, and the reflection direction of electromagnetic waves is changed by changing the alignment of the liquid crystal compound in the liquid crystal layer.

In contrast, as the electromagnetic wave control element in which the metasurface structure and the liquid crystal layer including the liquid crystal compound are combined, a configuration in which the liquid crystal compound constituting the liquid crystal layer is immobilized is also known.

Here, according to the studies conducted by the present inventors, in the electromagnetic wave control element having a combination of the metasurface structure and the liquid crystal layer in which the liquid crystal compound is immobilized, a variation in the reflectivity of electromagnetic waves in the plane is large, which requires improvement.

An object of the present invention is to solve such a problem of the related art and to provide an electromagnetic wave control element having a metasurface structure and a liquid crystal layer in which a liquid crystal compound is immobilized, in which the electromagnetic wave control element has a small variation in reflectivity of electromagnetic waves in the plane.

In order to accomplish the object, the present invention has the following configurations.

[1] An electromagnetic wave control element comprising, in the following order:

a metasurface member including a metasurface structure composed of a plurality of microstructures;

an interlayer disposed in contact with the metasurface member; and a liquid crystal film that is disposed in contact with the interlayer and includes a liquid crystal layer in which an alignment of a liquid crystal compound is immobilized, in which the interlayer is a bonding layer or an alignment layer.

[2] The electromagnetic wave control element according to [1], in which the metasurface structure acts on electromagnetic waves having a frequency of 0.1 to 0.3 THz.

[3] The electromagnetic wave control element according to [1] or [2], in which a thickness of the interlayer is 50 μm or less.

[4] The electromagnetic wave control element according to any one of [1] to [3], in which the electromagnetic wave control element has a reflective layer on a side of the metasurface member opposite to the interlayer or on a side of the liquid crystal film opposite to the interlayer.

[5] The electromagnetic wave control element according to any one of [1] to [4], in which the interlayer and the liquid crystal layer are in contact with each other.

[6] The electromagnetic wave control element according to any one of [1] to [5], in which the interlayer and the metasurface structure are in contact with each other.

According to the present invention, there is provided an electromagnetic wave control element having a metasurface structure and a liquid crystal layer in which a liquid crystal compound is immobilized, in which the electromagnetic wave control element has a small variation in reflectivity of electromagnetic waves in the plane.

DESCRIPTION OF THE PREFERRED EMBODIMENTS

Hereinafter, the electromagnetic wave control element of the embodiment of the present invention will be described in detail based on suitable Examples shown in the accompanying drawings.

In the present specification, numerical ranges represented by "to" include numerical values before and after "to" as lower limit values and upper limit values.

In the present specification, the meaning of "the same" includes a case where an error range is generally allowed in the technical field.

Each of the drawings shown below is conceptual views for describing the electromagnetic wave control element of the embodiment of the present invention. Accordingly, a shape, a size, a thickness, a positional relationship, and the like of each of members do not necessarily match with the actual ones.

Figure 1:
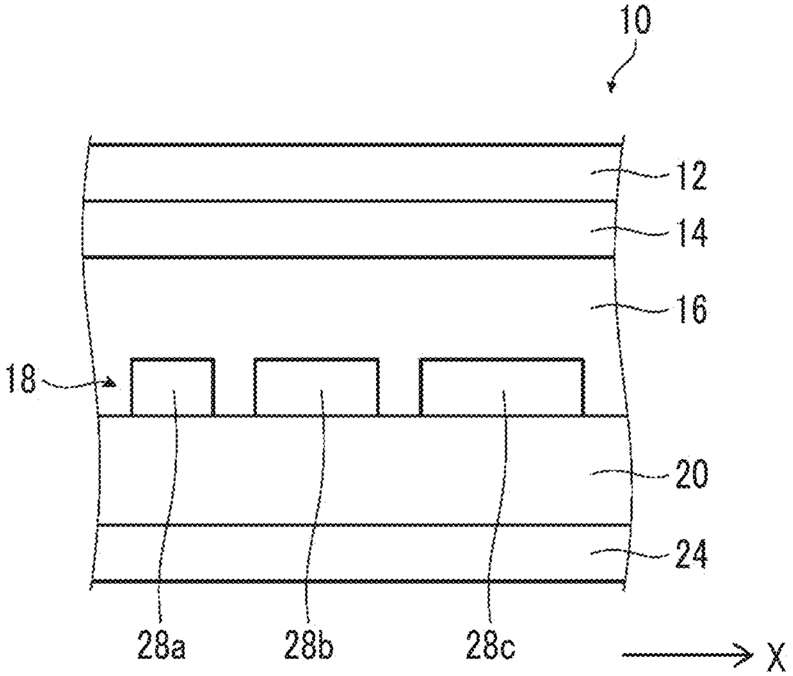
FIG. 1 is a view conceptually showing an example of an electromagnetic wave control element of an embodiment of the present invention.

An example of the electromagnetic wave control element of the embodiment of the present invention is conceptually shown in FIG. 1.

An electromagnetic wave control element 10 shown in FIG. 1 includes an alignment layer 12, a liquid crystal layer 14, a bonding layer 16, a metasurface structure 18, and a reflective layer 24 from the upper side in the drawing.

The metasurface structure 18 is composed of a plurality of microstructures arranged on a support body 20. The metasurface structure 18 in the example shown in the drawing is composed of three types of microstructures **28*a*, 28*b*, and 28*c* arranged on the support body 20**.

In the electromagnetic wave control element 10, as an example, the metasurface member in the embodiment of the present invention is composed of the support body 20 and the metasurface structure 18, and the liquid crystal film in the embodiment of the present invention is composed of the liquid crystal layer 14 and the alignment layer 12. Furthermore, in the electromagnetic wave control element 10, the bonding layer 16 serves as the interlayer in the present invention.

The electromagnetic wave control element 10 in the example shown in the drawing is configured by bonding a metasurface member (metasurface structure 18) and a liquid crystal film (liquid crystal layer 14) to each other through the bonding layer 16 as the interlayer.

Figure 2:
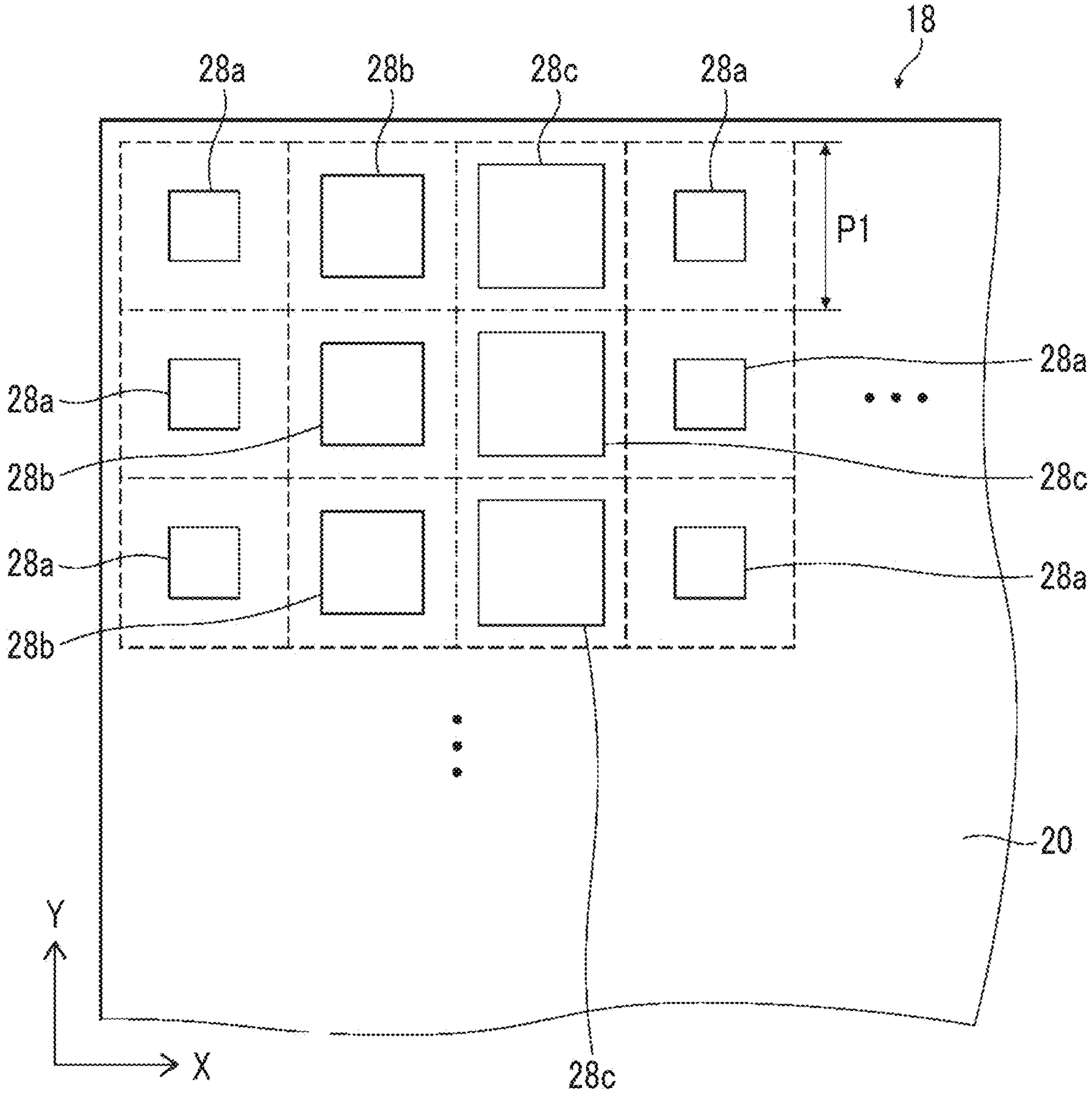
FIG. 2 is a view conceptually showing an example of a metasurface structure.

A plan view of the metasurface structure 18 is conceptually shown in FIG. 2.

Furthermore, the plan view is a view of the electromagnetic wave control element 10 as viewed from the lamination direction of the respective layers. In other words, the plan view is a view in which the electromagnetic wave control element 10 is seen from the normal direction of a main surface of each layer constituting the electromagnetic wave control element 10.

Here, the main surface is a maximum surface of a sheet-like material (a film, a plate-like material, a layer, or a membrane) and is usually both surfaces in the thickness direction.

In addition, the normal direction is a direction orthogonal to a surface such as a plane. That is, in the electromagnetic wave control element 10, the normal direction is a direction orthogonal to the main surface of each layer.

In the example shown in FIG. 2, the microstructures constituting the metasurface structure 18 are two-dimensionally arranged in the X direction and the Y direction orthogonal to each other on one main surface of the sheet-like support body 20.

Furthermore, in FIG. 1, the X direction is a horizontal direction toward the right side in the drawing and the Y direction is a direction toward the depth direction perpendicular to the paper surface in the drawing.

Specifically, it is assumed that square regions having one side length of P1, indicated by a broken line in FIG. 2, are two-dimensionally arranged in the x direction and the y direction on the main surface of the support body 20. In the following description, for convenience, the square region having the length of one side of P1 is also referred to as a "region P1".

In addition, the microstructure constituting the metasurface structure 18 is a plate-like structure having a square planar shape. The metasurface structure 18 has three types of the microstructures of the microstructure 28*a* having the smallest size, the microstructure 28*c* having the largest size, and the microstructure 28*b* having an intermediate size. Each microstructure is disposed at the center of the region P1 assumed for the support body 20 with the square alignment aligned.

In addition, in the metasurface structure 18, the arrangement of the microstructure 28*a*, the microstructure 28*b*, and the microstructure 28*c* in this order is provided repeatedly in the X direction, as shown in FIG. 2. That is, in the metasurface structure 18, the microstructures are arranged in the X direction as the microstructure 28*a*, the microstructure 28*b*, the microstructure 28*c*, the microstructure 28*a*, the microstructure 28*b*, the microstructure 28*c*, the microstructure 28*a*, the microstructure 28*b*, and . . . .

On the other hand, the same microstructure is arranged in the Y direction.

The metasurface structure 18 performs phase modulation of incident electromagnetic waves by utilizing a resonance of the microstructure, which is a resonator, by an arrangement of unit cells consisting of one microstructure and a space in the assumed square region P1.

Here, in a preferred aspect, the metasurface structure 18 in the example shown in the drawing acts on electromagnetic waves having a frequency of 0.1 to 0.3 THz, and modulates the phase of the electromagnetic waves having this frequency. That is, the metasurface structure 18 acts on electromagnetic waves having a wavelength of 1 to 3 mm in a preferred aspect, and modulates a phase of the electromagnetic waves having the wavelength.

In addition, a reflective layer 24 that reflects the electromagnetic waves having a frequency of 0.1 to 0.3 THz is provided on a surface of the support body 20 opposite to the metasurface structure 18.

That is, in the electromagnetic wave control element 10 shown in FIG. 1, the reflective layer 24 is provided on a side opposite to the bonding layer 16 (interlayer) of the metasurface member.

The liquid crystal layer 14 is formed by aligning and immobilizing a liquid crystal compound.

In the electromagnetic wave control element 10 of the embodiment of the present invention, the liquid crystal layer 14 also performs phase modulation of incident electromagnetic waves, as in the metasurface structure 18.

In the electromagnetic wave control element 10 having the metasurface structure 18, the liquid crystal layer 14, and the reflective layer 24, the phase of the electromagnetic waves incident from the alignment layer 12 side is modulated by the liquid crystal layer 14 and the metasurface structure 18, and the phase of the electromagnetic waves reflected by the reflective layer 24 is modulated again by the metasurface structure 18 and the liquid crystal layer 14, and then emitted.

As a result, the electromagnetic wave control element 10 reflects incident electromagnetic waves in a direction different from specular reflection.

For example, in a case where electromagnetic waves are incident from the normal direction of the liquid crystal layer 14, the electromagnetic waves are reflected in a direction tilted with respect to the normal direction instead of the normal direction.

As described above, the metasurface structure 18 is composed of the microstructures arranged on one surface of the support body 20.

The support body 20 is not limited, and various known sheet-like materials can be used as long as they can support the microstructure and can transmit electromagnetic waves on which the metasurface structure 18 acts, that is, electromagnetic waves having a frequency of 0.1 to 0.3 THz.

In the following description, the electromagnetic waves refer to electromagnetic waves having this frequency unless otherwise specified.

Examples of the support body 20 include a metal substrate having an oxide insulating layer such as a silicon substrate having silicon oxide, a substrate consisting of an oxide such as silicon oxide, a semiconductor substrate such as a germanium substrate and a chalcogenide glass substrate, a resin film, for example, a polyacrylic resin film such as polymethyl methacrylate, a cellulose-based resin film such as cellulose triacetate, a cycloolefin polymer-based film, a polyethylene terephthalate (PET) film, a polycarbonate film, and a polyvinyl chloride resin film, and a glass plate. Examples of a commercially available product of the cycloolefin polymer-based film include product name "ARTON" manufactured by JSR Corporation, and product name "ZEONOR" manufactured by Zeon Corporation.

The thickness of the support body 20 is not limited, and may be appropriately set depending on a material for forming the support body 20 such that the microstructure can be supported, a necessary transmittance with respect to the electromagnetic waves can be obtained, and a sufficient strength can be obtained depending on the use of the electromagnetic wave control element 10, and the like.

Furthermore, in the electromagnetic wave control element 10 of the embodiment of the present invention, the metasurface structure 18 is not limited to ones having the support body 20.

That is, in the electromagnetic wave control element of the embodiment of the present invention, the metasurface structure 18 may be formed by arranging the microstructures on the surface of another layer such as an interlayer, if possible.

A plurality of microstructures are arranged on one surface of the support body 20. The metasurface structure 18 is formed by the arrangement of the microstructures.

As described above, the metasurface structure 18 is formed by two-dimensionally arranging the microstructures on a plane with a spacing therebetween, and is basically composed of an arrangement of unit cells formed of one microstructure and a space around the microstructure. In the example shown in the drawing, the unit cell is composed of one microstructure and a region P1 which is a square having one side P1 on which the microstructure is disposed.

In addition, in the example shown in the drawing, the metasurface structure 18 is formed by arranging three microstructures 28*a*, 28*b*, and 28*c* having different sizes.

In the electromagnetic wave control element of the embodiment of the present invention, the metasurface structure is basically a known metasurface structure (metamaterial). Accordingly, in the electromagnetic wave control element 10 of the embodiment of the present invention, the metasurface structure is not limited to the configuration shown in FIG. 2 and the like, and various known metasurface structures can be used.

That is, in the present invention, the shape of the microstructure and the material for forming the microstructure, the arrangement of the microstructures, the interval (pitch) of the microstructures, the planar shape and the size of the unit cell, and the like are also not limited.

In addition, the metasurface structure may be designed by a known method according to the reflection characteristics of electromagnetic waves on which the electromagnetic wave control element 10 of the embodiment of the present invention acts. As one example, the amplitude and phase of the electromagnetic waves whose phase is modulated by the microstructure to be used may be calculated using commercially available simulation software, and the arrangement of the microstructures may be set to obtain a desired distribution of the phase modulation amount.

In the electromagnetic wave control element 10, in a preferred aspect, the metasurface structure 18 acts on electromagnetic waves having a frequency of 0.1 to 0.3 THz. Accordingly, the microstructure is selected and the arrangement of the microstructures, the planar shape of the unit cell, the size, and the like are set such that the in the metasurface structure 18 appropriately acts on the electromagnetic waves having this frequency.

Furthermore, the metasurface structure 18 is basically composed of an arrangement of unit cells formed of one microstructure and a space around the microstructure. The metasurface structure 18 modulates the phase of incident electromagnetic waves by utilizing the resonance of the microstructure by arranging the unit cells.

Here, in the electromagnetic wave control element 10 of the embodiment of the present invention, the number of the microstructures included in one unit cell is basically one, but the present invention is not limited thereto. That is, in the electromagnetic wave control element of the embodiment of the present invention, one unit cell may have a plurality of microstructures as necessary depending on the desired optical characteristics, the size, the formation material, and the shape of the microstructure, the size of the unit cell, and the like. In this case, one unit cell may have different microstructures. It should be noted that in a case where one unit cell has the plurality of microstructures, basically, the phase modulation amounts in the space where each resonator of the unit cell is present are the same.

In the electromagnetic wave control element 10 of the embodiment of the present invention, the material for forming the microstructure constituting the metasurface structure 18 is not limited and various materials used as a resonator in a known metasurface structure can be used.

Examples of the material for forming the microstructure include a metal and a dielectric. In a case of a metal, copper, gold, and silver are preferably exemplified from the viewpoint of low optical loss. On the other hand, in a case of a dielectric substance, silicon, titanium oxide, and germanium are preferably exemplified from the viewpoint that the refractive index is large and a large phase modulation is possible.

Similarly, the shape of the microstructure constituting the metasurface structure 18 is not also limited, and various shapes that can be used as resonators in known metasurface structures can be used.

Examples of the shape include not only the above-described plate-like material having a square planar shape but also a plate-like material having a rectangular planar shape, a cross-like three-dimensional structure in which cuboids intersect with each other, a cuboid shape, a cylindrical shape, a V-like three-dimensional structure in which cuboids are connected to end parts as described in JP2018-046395A, a substantially H-like three-dimensional structure such as H-steel, and a substantially C-like three-dimensional structure such as a C-channel.

In addition, as the V-like three-dimensional structure as shown in JP2018-046395A, and the cross-like three-dimensional structure, various shapes where an angle between two cuboids is adjusted can be used.

Figure 5:
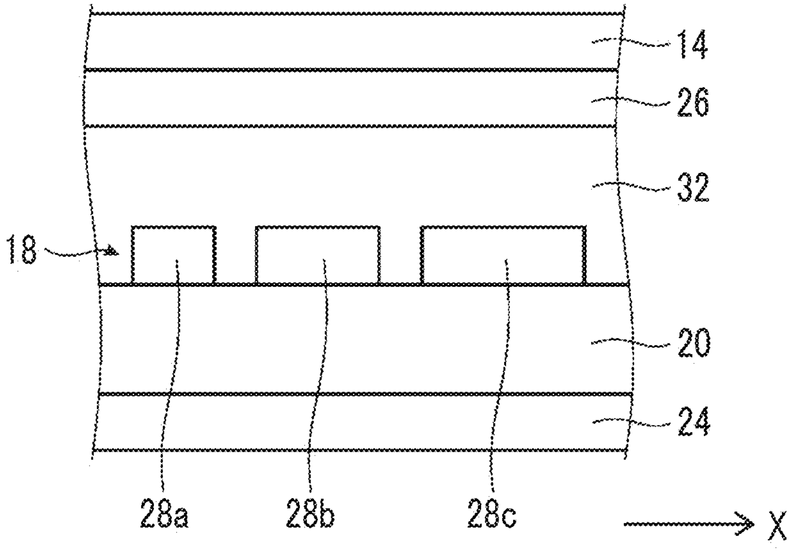
FIG. 5 is a view conceptually showing another example of the electromagnetic wave control element of the embodiment of the present invention.

In addition to those, the three-dimensional structure having a bottom surface shape as shown in FIG. 5 of "Appl. Sci. 2018, 8(9), 1689; https://doi.org/10.3390/app8091689", or the like can also be used.

In the metasurface structure 18, such a microstructure may be used alone or in combination of a plurality of kinds thereof. In addition, the same microstructures may be arranged in the same orientation as or different orientation from that as shown in FIG. 2, or the microstructures arranged in the same orientation and the microstructures arranged in different orientations may be mixed.

The reflective layer 24 reflects the electromagnetic waves that are incident from the alignment layer 12 side and transmitted through the liquid crystal layer 14, the bonding layer 16, and the metasurface structure 18.

The reflective layer 24 is not limited, and various known sheet-like materials can be used as long as they can reflect electromagnetic waves on which the metasurface structure 18 acts. In the example shown in the drawing, the metasurface structure 18 acts on electromagnetic waves having a frequency of 0.1 to 0.3 THz in a preferred aspect.

In this case, examples of the reflective layer 24 include metal layers such as copper, aluminum, gold, and silver, inorganic conductive materials such as indium tin oxide (ITO), organic conductive materials such as polythiophene represented by poly(3,4-ethylenedioxythiophene) (PEDOT), and graphene. Furthermore, the inorganic conductive material, the organic conductive material, the graphene, and the like are transparent to visible light, but act as a reflective layer with respect to the electromagnetic waves having the frequency.

The thickness of the reflective layer 24 is not limited, and the thickness with which electromagnetic waves can be reflected with a required reflectivity may be appropriately set depending on the material for forming the reflective layer 24.

The electromagnetic wave control element of the embodiment of the present invention has a liquid crystal film in addition to the metasurface member having the metasurface structure 18 and the support body 20.

As described above, in the electromagnetic wave control element 10 in the example shown in the drawing, the liquid crystal film has the liquid crystal layer 14 and the alignment layer 12.

The liquid crystal layer 14 is formed by aligning and immobilizing a liquid crystal compound.

The electromagnetic wave control element 10 of the embodiment of the present invention has, in addition to the metasurface structure 18, the liquid crystal layer 14 in which a liquid crystal compound is aligned and thus immobilized, and modulates the phase of the electromagnetic waves transmitted through the liquid crystal layer 14 depending on the refractive index of the liquid crystal layer 14.

By configuring the electromagnetic wave control element 10 of the embodiment of the present invention to have such a liquid crystal layer 14, it is possible to perform compensation for a disturbance of phase modulation of electromagnetic waves caused by the separation and the like of the microstructures constituting the metasurface structure 18, compensation for a disturbance of phase modulation of electromagnetic waves caused by a difference in size of the microstructures constituting the metasurface structure 18, compensation for a disturbance of phase modulation of electromagnetic waves caused by a difference in shape of the microstructures constituting the metasurface structure 18, control of a phase modulation amount of electromagnetic waves in the electromagnetic wave control element 10, control of a reflection direction of incident electromagnetic waves, and the like.

In the present invention, the alignment of the liquid crystal compound in the liquid crystal layer 14 is not limited and it is possible to use various alignments.

As an example, in a case where the liquid crystal compound is a rod-like liquid crystal compound, examples of the alignment include a horizontal alignment in which the longitudinal direction, that is, the optical axis derived from the liquid crystal compound is parallel to the main surface of the liquid crystal layer 14, a vertical alignment in which the longitudinal direction is the thickness direction of the liquid crystal layer 14, and an alignment in which the longitudinal direction is tilted with respect to the main surface of the liquid crystal layer 14.

In a case of the horizontal alignment, for example, the longitudinal direction may coincide with the X direction or the Y direction, or may be aligned in a direction having an angle with respect to the X direction and the Y direction.

In addition, the alignment of the liquid crystal compound in the liquid crystal layer 14 may have a liquid crystal alignment pattern in which a periodic change is repeated. Examples of the alignment pattern include a liquid crystal alignment pattern in which the longitudinal direction changes while continuously rotating (rotating at a constant rotation angle) in the X direction or the Y direction described above, a liquid crystal alignment pattern in which the longitudinal direction changes while non-continuously rotating (rotating at a rotation angle that is not constant) in the X direction or the Y direction described above, and a liquid crystal alignment pattern in which the alignment in the X direction and the alignment in the Y direction are alternately repeated in one direction with a predetermined length (period).

Furthermore, in a case where the microstructure constituting the metasurface structure is arranged in a periodic pattern, it is also possible to suitably use a liquid crystal alignment pattern corresponding to the arrangement pattern of the microstructure.

For example, in the metasurface structure 18 in the example shown in the drawing, the small-sized microstructure **28*a*, the medium-sized microstructure 28*b*, and the large-sized microstructure 28*c* are repeatedly arranged in the X direction in this order, as shown in FIG. 2**. In addition, each microstructure is disposed at the center of a region P1 that is a square having one side length of P1.

Figure 3:
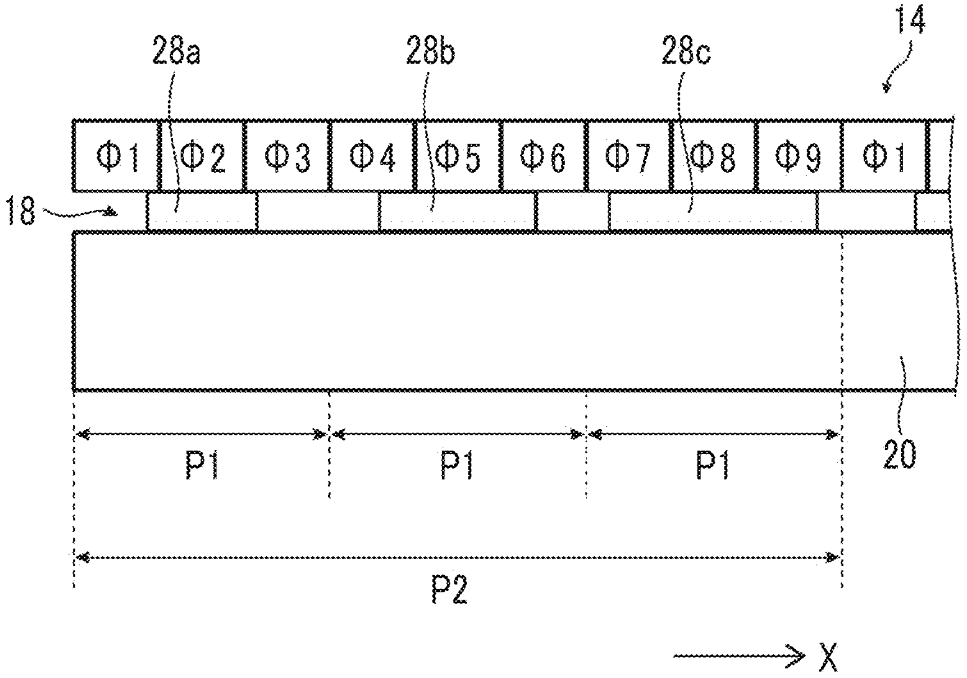
FIG. 3 is a conceptual view for describing a liquid crystal layer.

In response to this, a liquid crystal alignment pattern in which a predetermined alignment pattern is repeated with a region P2 obtained by combining three regions P1 in the X direction in which the microstructure **28*a*, the microstructure 28*b*, and the microstructure 28*c* are arranged as one unit, as conceptually shown in FIG. 3**, is exemplified.

Furthermore, in FIG. 3, only the support body 20, the metasurface structure 18, and the liquid crystal layer 14 are shown for the sake of simplicity of the drawing.

In the example shown in FIG. 3, as an example, the region P2 is divided into nine regions from Φ1 to Φ9 in the X direction by dividing the region P1 into three regions in the X direction. Specifically, the region P1 in which the small-sized microstructure **28*a* is disposed is divided into regions Φ1 to Φ3, the region P1 in which the medium-sized microstructure 28*b* is disposed is divided into regions Φ4 to Φ6, and the region P1 in which the large-sized microstructure 28*c*** is disposed is divided into regions Φ7 to Φ9.

In these nine regions, the liquid crystal compound is horizontally aligned, and the angle of the longitudinal direction of the liquid crystal compound with respect to the X direction is determined for each region. Furthermore, Φ1 to Φ9 may have regions in which the angles of the liquid crystal compound in the longitudinal direction with respect to the X direction are the same.

In the present example, the liquid crystal layer 14 has a liquid crystal alignment pattern in which the region P2 consisting of Φ1 to Φ9 having the nine alignment states is set as one period, and the one period is repeated in the X direction.

Furthermore, in the example shown in FIG. 3, the region P1 is not limited to the one being divided into three regions, and the region P1 may be one region or may be divided into two regions or four or more regions.

In addition, the number of divisions may be different in the region P1 corresponding to each microstructure.

Furthermore, in a case where the liquid crystal compound is a disc-like liquid crystal compound, a direction coinciding with a direction orthogonal to a disc plane is an optical axis derived from the liquid crystal compound. Accordingly, in a case where the liquid crystal compound is a disc-like liquid crystal compound, an alignment state where the direction of the optical axis is aligned as in the above-described liquid crystal compound is exemplified.

In the electromagnetic wave control element 10 of the embodiment of the present invention, the liquid crystal layer 14 may be manufactured by a known method depending on the alignment of the liquid crystal compound in the liquid crystal layer 14.

Accordingly, the liquid crystal compound forming the liquid crystal layer 14 is not limited, and thus, the liquid crystal compound may be a rod-like liquid crystal compound or a disc-like liquid crystal compound.

—Rod-Like Liquid Crystal Compound—

As the rod-like liquid crystal compound, azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolanes, and alkenylcyclohexylbenzonitriles are preferably used.

As the rod-like liquid crystal compound, not only the low-molecular-weight liquid crystal molecules as described above but also high-molecular-weight liquid crystal molecules can be used.

In the liquid crystal layer 14, it is preferable that the alignment of the rod-like liquid crystal compound is immobilized by polymerization. That is, it is preferable that the liquid crystal layer 14 is a layer obtained by polymerizing and immobilizing a polymerizable rod-like liquid crystal compound.

Examples of the polymerizable rod-like liquid crystal compound include the compounds described in Makromol. Chem., (1989), Vol. 190, p. 2255, Advanced Materials (1993), Vol. 5, p. 107, Advanced Photonics Vol. 2, Art. 036002 (2020), U.S. Pat. Nos. 4,683,327A, 5,622,648A, 5,770,107A, WO95/022586A, WO95/024455A, WO97/000600A, WO98/023580A, WO98/052905A, JP1989-272551A (JP-H01-272551A), JP1994-016616A (JP-H06-016616A), JP1995-110469A (JP-H07-110469A), JP1999-080081A (JP-H11-080081A), JP2001-064627A, and the like.

Furthermore, as the rod-like liquid crystal compound, for example, the compounds described in JP1999-513019A (JP-H11-513019A) and JP2007-279688A can also be preferably used.

—Disc-Like Liquid Crystal Compound—

As the disc-like liquid crystal compound, for example, the compounds described in JP2007-108732A and JP2010-244038A can be preferably used.

The liquid crystal layer 14 in which the liquid crystal compound is aligned and immobilized may be formed as with a known liquid crystal layer in which the alignment of the liquid crystal compound is immobilized.

As an example, the liquid crystal layer 14 is formed by applying a composition including a liquid crystal compound and the like to the alignment layer 12 for aligning a liquid crystal compound, drying the composition, and as necessary, polymerizing the liquid crystal compound.

In the electromagnetic wave control element 10 of the embodiment of the present invention, the thickness of the liquid crystal layer 14 is not limited and may be appropriately set depending on a material for forming the liquid crystal layer 14, a desired refractive index, that is, a desired modulation amount of the phase, and the like.

The thickness of the liquid crystal layer 14 is preferably 1 to 10,000 μm, more preferably 10 to 5,000 μm, and still more preferably 100 to 2,000 μm.

As described above, in the electromagnetic wave control element 10 in the example shown in the drawing, the liquid crystal film is composed of the alignment layer 12 and the liquid crystal layer 14.

As an example, in the electromagnetic wave control element 10 in the example shown in the drawing, a laminated film in which an alignment layer 12 is formed on a surface of a liquid crystal layer support body, and a liquid crystal layer 14 is formed on a surface of the alignment layer 12 is formed. Next, the liquid crystal layer 14 and the bonding layer 16 described below are caused to face each other, and the laminated film is bonded to the bonding layer 16. Thereafter, the liquid crystal layer support body is peeled from the laminated film, and the alignment layer 12 and the liquid crystal layer 14 are transferred to the bonding layer 16 to form a liquid crystal film.

In the electromagnetic wave control element 10 of the embodiment of the present invention, various known alignment layers can be used as the alignment layer 12 for aligning the liquid crystal compound constituting the liquid crystal layer 14 as long as they have a transmittance required for electromagnetic waves.

Examples of the alignment layer 12 include a rubbing-treated film consisting of an organic compound such as a polymer, an obliquely vapor-deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment layer 12 formed by a rubbing treatment can be formed by rubbing a surface of a polymer layer with paper or fabric in a given direction multiple times.

Preferred examples of the material used for the alignment layer 12 include a polyimide, a polyvinyl alcohol, the polymer having a polymerizable group described in JP1997-152509A (JP-H09-152509A), and the materials used for forming the alignment layer 12 described in JP2005-97377A, JP2005-99228A, JP2005-128503A, and the like.

In the electromagnetic wave control element of the embodiment of the present invention, the alignment layer 12 is suitably used as a so-called photo-alignment layer obtained by irradiating a photo-alignment material with polarized light or non-polarized light to form the alignment layer 12. That is, in the electromagnetic wave control element of the embodiment of the present invention, an alignment layer 12 formed by applying a composition including a photo-alignment material onto a liquid crystal layer support body is suitably used as the alignment layer 12.

Preferred examples of the photo-alignment material used for the alignment layer 12 that can be used in the present invention include the azo compounds described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B, the aromatic ester compounds described in JP2002-229039A, the maleimide and/or alkenyl-substituted nadiimide compounds having a photo-alignable unit described in JP2002-265541A and JP2002-317013A, the photo-crosslinkable silane derivatives described in JP4205195B and JP4205198B, the photo-crosslinkable polyimide, photo-crosslinkable polyamide, and photo-crosslinkable ester described in JP2003-520878A, JP2004-529220A, and JP4162850B, and the photo-dimerizable compounds, in particular, the cinnamate compound, chalcone compound, and coumarin compound described in JP1997-118717A (JP-H09-118717A), JP1998-506420A (JP-H10-506420A), JP2003-505561A, WO2010/150748A, JP2013-177561A, and JP2014-012823A.

Among those, the azo compounds, the photo-crosslinkable polyimide, the photo-crosslinkable polyamide, the photo-crosslinkable ester, the cinnamate compound (cinnamoyl compound), and the chalcone compound are suitably used as the photo-alignment material.

The thickness of the alignment layer 12 is not limited, and the thickness with which a required alignment function can be obtained may be appropriately set depending on the material for forming the alignment layer 12.

The thickness of the alignment layer 12 is preferably 0.01 to 5 μm, and more preferably 0.05 to 2 μm.

A method of forming the alignment layer 12 is not limited, and various known methods depending on a material for forming the alignment layer 12 can be used.

Examples of the method of forming the alignment layer 12 using a photo-alignment material include a method of applying a composition including a photo-alignment material serving as the alignment layer 12, and the like onto a surface of the liquid crystal layer support body, drying the composition, and exposing the alignment layer 12 to polarized or unpolarized ultraviolet rays.

In addition, in a case of forming an alignment pattern corresponding to the liquid crystal alignment pattern, the alignment layer 12 having a desired alignment pattern can be formed by repeating a process of shielding an unnecessary region with a mask, exposing the composition to linearly polarized light depending on a desired alignment direction of a liquid crystal compound, changing a position of the mask and a direction of the linearly polarized light depending on the alignment pattern to be formed, and exposing the composition again.

The electromagnetic wave control element 10 shown in FIG. 1 has a configuration in which a metasurface member having a support body 20 and a metasurface structure 18, in which the reflective layer 24 is formed on one surface of the support body 20, and a liquid crystal film having an alignment layer 12 and a liquid crystal layer 14 are bonded to each other through a bonding layer 16, with the metasurface structure 18 and the liquid crystal layer 14 facing each other.

In the electromagnetic wave control element 10, the metasurface member and the bonding layer 16 as the interlayer are disposed in contact with each other, and the bonding layer 16 as the interlayer and the liquid crystal film are disposed in contact with each other.

By allowing the electromagnetic wave control element 10 of the embodiment of the present invention to have such a configuration, a variation in reflectivity of the electromagnetic wave in the plane is small, and as a result, an electromagnetic wave control element having a high reflectivity is realized.

As described above, the electromagnetic wave control element 10 is a reflective type electromagnetic wave control element that reflects electromagnetic waves incident from the alignment layer 12 side.

Specifically, the phase of the electromagnetic waves incident on the electromagnetic wave control element 10 from the alignment layer 12 side is modulated by the refractive index (birefringence) of the liquid crystal layer 14. The electromagnetic wave whose phase has been modulated by the liquid crystal layer 14 is phase-modulated by the resonance of the microstructure in the metasurface structure 18, and then reflected by the reflective layer 24. The phase of the electromagnetic waves reflected by the reflective layer 24 is modulated again by the resonance of the microstructure in the metasurface structure 18. The electromagnetic waves whose phase has been modulated by the metasurface structure 18 are then phase-modulated by the refractive index of the liquid crystal layer 14, and emitted as electromagnetic waves reflected by the electromagnetic wave control element 10.

In addition, the electromagnetic waves reflected by the electromagnetic wave control element 10 are emitted at an angle different from specular reflection, instead of being specularly reflected, by the phase modulation by the metasurface structure 18 and the liquid crystal layer 14. For example, in a case where electromagnetic waves are incident on the electromagnetic wave control element 10 from the normal direction, the electromagnetic waves are emitted in a direction having an angle with respect to the normal direction.

In such an electromagnetic wave control element 10, it is important that the liquid crystal layer 14 is entirely provided uniformly in the metasurface structure 18 without causing deflection, distortion, and the like of the liquid crystal layer 14.

That is, the electromagnetic wave control element 10 including the liquid crystal layer 14 and the metasurface structure 18 controls the phase of the electromagnetic waves incident on the liquid crystal layer 14 and the metasurface structure 18 to emit the electromagnetic waves in a desired direction.

Therefore, in a case where the positional relationship between the liquid crystal layer 14 and the metasurface structure 18 in the transmission direction of electromagnetic waves are partially different from each other due to the deflection of the liquid crystal layer, or the like, it is not possible to perform appropriate control of the phase in this portion. As a result, the reflectivity is partially decreased in the plane, the deviation of the reflection direction occurs and a variation in reflectivity of the electromagnetic waves in the plane occurs.

On the other hand, in the electromagnetic wave control element 10 of the embodiment of the present invention, the metasurface member and the interlayer are disposed in contact with each other as described above, and the interlayer and the liquid crystal film are disposed in contact with each other. In the example shown in the drawing, since the interlayer is the bonding layer 16, the metasurface member and the bonding layer 16 are bonded to each other, and the bonding layer 16 and the liquid crystal film are bonded to each other.

In other words, in the electromagnetic wave control element 10 of the embodiment of the present invention, the positional relationship between the liquid crystal layer 14 and the metasurface structure 18 is defined by the interlayer, and the liquid crystal layer 14 is entirely provided uniformly in the entire surface of the metasurface structure 18 without causing deflection and the like.

Therefore, with the electromagnetic wave control element 10 of the embodiment of the present invention, it is possible to appropriately perform a phase control of electromagnetic waves over the entire surface in the plane direction, and as a result, it is possible to suppress a variation in reflectivity of electromagnetic waves in the plane to reflect the electromagnetic waves with a high reflectivity.

In particular, in the electromagnetic wave control element 10 shown in FIG. 1, in a preferred aspect, since the metasurface structure 18 and the bonding layer 16 as the interlayer are in contact with each other, and the bonding layer 16 as the interlayer and the liquid crystal layer 14 are in contact with each other, the effect can be more suitably obtained.

In the electromagnetic wave control element 10 of the embodiment of the present invention, as the bonding layer 16, a layer consisting of a known bonding agent can be used as long as it has a transmittance required for electromagnetic waves.

Accordingly, the bonding agent as the bonding layer 16 may be an adhesive, a pressure sensitive adhesive, or a material having both characteristics of the adhesive and the pressure sensitive adhesive. Furthermore, the adhesive is a bonding agent which has fluidity in a case of bonding layers and is to be a solid state. On the other hand, the pressure sensitive adhesive is a bonding agent which is a gel-like (rubber-like) flexible solid in a case of bonding layers and whose gel-like state does not change thereafter.

Examples of the bonding agent include a pressure sensitive adhesive.

Examples of the pressure sensitive adhesive include a pressure sensitive adhesive, a drying and solidifying type adhesive, and a chemical reaction type adhesive.

Examples of the chemical reaction type adhesive include an active energy ray curable adhesive.

The pressure sensitive adhesive generally includes a polymer and may include a solvent. Examples of the polymer include an acrylic polymer, a silicone-based polymer, a polyester, a polyurethane, and a polyether. Among these pressure sensitive adhesives, a pressure sensitive adhesive including an acrylic polymer is preferable since it has excellent optical transparency, appropriate wettability and cohesive force, excellent adhesiveness, high weather fastness, high heat resistance, and the like, and thus, floating, peeling, and the like are unlikely to occur under heating or humidification conditions. As the acrylic polymer, for example, a copolymer of a (meth)acrylate in which an alkyl group of an ester moiety is an alkyl group having 1 to 20 carbon atoms, such as a methyl group, an ethyl group, or a butyl group, and a (meth)acrylic monomer having a functional group, such as (meth)acrylic acid and hydroxyethyl (meth)acrylate, is preferable. The pressure sensitive adhesive including such a copolymer is preferable since it has excellent pressure sensitive adhesiveness and can be relatively easily removed without causing paste residue or the like on an object to be transferred even in a case of being removed after being bonded to the object to be transferred. A glass transition temperature of the acrylic polymer is preferably 25° C. or lower, and more preferably 0° C. or lower. The mass average molecular weight of the acrylic polymer is preferably 100,000 or more.

Furthermore, it is also possible to suitably use commercially available products such as NCF-F619, NCF-F632, and NCF-F692 manufactured by LINTEC Corporation as the bonding agent.

The thickness of the bonding layer 16 is not limited, and the thickness at which necessary performance such as an adhesive strength (alignment strength) is exhibited may be appropriately set depending on the material for forming the bonding layer 16.

In the present invention, the bonding layer 16 (interlayer) is basically preferably thinner. That is, it is preferable that the distance between the metasurface member and the liquid crystal film is short, and it is particularly preferable that the distance between the metasurface structure 18 and the liquid crystal layer 14 is short.

Specifically, the thickness of the bonding layer 16 is preferably 60 μm or less, more preferably 50 μm or less, and still more preferably 30 μm or less.

It is preferable to set the thickness of the bonding layer 16 to 60 μm or less from the viewpoint that the variation in the reflectivity of electromagnetic waves in the plane can be more suitably suppressed and the reflectivity of electromagnetic waves can be improved.

In addition, in the present invention, the distance between the metasurface structure 18 and the liquid crystal layer 14 is preferably 150 μm or less, more preferably 110 μm or less, and still more preferably 80 μm or less.

The refractive index of the bonding layer 16 is not limited, but is preferably close to the refractive index of the liquid crystal layer 14.

Specifically, the refractive index of the bonding layer 16 (interlayer) is preferably 1.3 to 1.7, more preferably 1.4 to 1.67, and still more preferably 1.44 to 1.60.

It is preferable to set the refractive index of the bonding layer 16 to 1.3 to 1.7 from the viewpoint that unnecessary reflection at the interface of the bonding layer 16 can be suppressed, and as a result, for example, the reflectivity can be improved and the stray light can be reduced.

The electromagnetic wave control element 10 shown in FIG. 1 has the alignment layer 12 for aligning the liquid crystal compound on the electromagnetic wave incident surface side of the liquid crystal layer 14, but the present invention is not limited thereto. That is, the electromagnetic wave control element of the embodiment of the present invention may not have the alignment layer 12, and the liquid crystal layer 14 may be an incident and emission surface of electromagnetic waves. In other words, the liquid crystal film in the electromagnetic wave control element of the embodiment of the present invention may be formed of only the liquid crystal layer 14.

As described above, in the production of the electromagnetic wave control element 10, as an example, a laminated film in which the alignment layer 12 is formed on a surface of the liquid crystal layer support body, and the liquid crystal layer 14 is formed on a surface of the alignment layer 12 is formed. Next, the liquid crystal layer 14 and the bonding layer 16 described below are caused to face each other, and the laminated film is bonded to the bonding layer 16. Thereafter, the liquid crystal layer support body is peeled from the laminated film, and the alignment layer 12 and the liquid crystal layer 14 are transferred to the bonding layer 16 to form a liquid crystal film.

In this case, the alignment layer 12 is peeled from the laminated film together with the liquid crystal layer support body. This may result in an electromagnetic wave control element in which a liquid crystal layer 14, a bonding layer 16, a metasurface structure 18, a support body 20, and a reflective layer 24 are laminated in this order from the electromagnetic wave incident side.

Alternatively, the electromagnetic wave control element of the embodiment of the present invention may have a layer configuration in which the liquid crystal layer support body, the alignment layer 12, the liquid crystal layer 14, the bonding layer 16, the metasurface structure 18, the support body 20, and the reflective layer 24 are laminated in this order from the electromagnetic wave incident side.

That is, the liquid crystal film in the electromagnetic wave control element of the embodiment of the present invention may be the laminated film having a three-layer configuration including a liquid crystal layer support body, an alignment layer 12, and a liquid crystal layer 14.

Accordingly, in this configuration, the liquid crystal layer support body serves as an incident and emission surface of electromagnetic waves.

In the configuration in which the liquid crystal layer support body serves as an incident and emission surface of electromagnetic waves, the liquid crystal layer support body is preferably formed of a material having a low retardation not to affect the incident electromagnetic waves and the emitted electromagnetic waves.

Specifically, the liquid crystal layer support body in this configuration is preferably formed of a low retardation material such as a cycloolefin copolymer (COCC), triacetyl cellulose (TAC), diacetyl cellulose (DAC), methyl cellulose (MC), polyimide (PI), a (meth)acrylic polymer, polyethylene (PE), polypropylene (PP), polystyrene (PS), polyethylene terephthalate (PET), polycarbonate (PC), polyphenylene ether (PPE), polytetrafluoroethylene (PTFE), perfluoroalkoxyalkane (PFA), perfluoroethylene propene (FEP), ethylene tetrafluoroethylene (ETFE), polyvinylidene fluoride (PVDF), polychlorotrifluoroethylene (PCTFE), ethylene chlorotrifluoroethylene (ECTFE), an epoxy resin, and a phenol resin.

The thickness of the liquid crystal layer support body is not limited, and the thickness capable of supporting the alignment layer 12 and the liquid crystal layer 14 may be appropriately set depending on the formation material, but is preferably 50 to 1,000 μm, more preferably 80 to 700 μm.

Furthermore, the configurations of the various liquid crystal films can also be used in various electromagnetic wave control elements shown below.

In the electromagnetic wave control element 10 shown in FIG. 1, the bonding layer 16 is used as an interlayer in contact with the metasurface member and the liquid crystal film, but in the electromagnetic wave control element of the embodiment of the present invention, an alignment layer for aligning the liquid crystal compound of the liquid crystal layer 14 can also be used as the interlayer.

Figure 4:
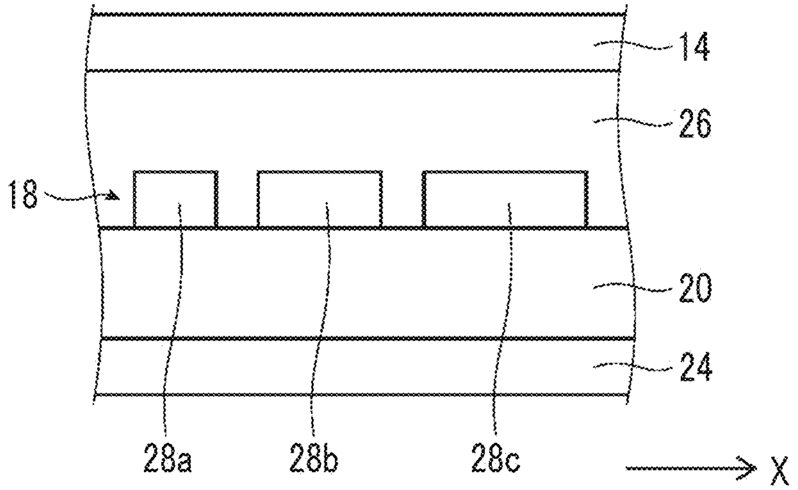
FIG. 4 is a view conceptually showing another example of the electromagnetic wave control element of the embodiment of the present invention.

One example thereof is conceptually shown in FIG. 4. Furthermore, in the electromagnetic wave control element shown in FIG. 4, since the same members are frequently used in the electromagnetic wave control element shown in FIG. 1, the same members are denoted by the same reference numerals and descriptions thereof will be mainly made for different parts in the following examples.

In addition, the effects of the liquid crystal layer 14 and the metasurface structure 18 are also the same as those of the above-described electromagnetic wave control element shown in FIG. 1.

The electromagnetic wave control element shown in FIG. 4 has an alignment layer 26 as an interlayer that covers a metasurface structure 18 formed on a surface of a support body 20, and has a liquid crystal layer 14 on a side of the alignment layer 26 opposite to the metasurface structure 18.

Therefore, also in the present example, the metasurface member and the alignment layer 26 as the interlayer are disposed in contact with each other, and the alignment layer 26 as the interlayer and the liquid crystal film are disposed in contact with each other. In addition, also in this configuration, in a preferred aspect, the metasurface structure 18 and the alignment layer 26 as the interlayer are disposed in contact with each other, and the alignment layer 26 as the interlayer and the liquid crystal layer are disposed in contact with each other.

As a result, as in a case of the electromagnetic wave control element shown in FIG. 1, the variation in the reflectivity of the electromagnetic wave in the plane can be suppressed, and the reflectivity of the electromagnetic waves can thus be improved.

The alignment layer 26 as the interlayer is not limited, and various known alignment layers such as the alignment layer exemplified in the above-described alignment layer 12 can be used. Among these, for the alignment layer 26 as an interlayer, an alignment layer (photo-alignment layer) using a photo-alignment material is suitably used.

As described above, the alignment layer 12 in which a photo-alignment material is used is formed of a coating layer in which a composition including a photo-alignment material is used. In addition, the liquid crystal layer 14 in which the liquid crystal compound is aligned by the alignment layer is also formed by a coating method using a composition including a liquid crystal compound.

Therefore, the metasurface member and the alignment layer 26, and the alignment layer 26 and the liquid crystal layer 14 are entirely adhered to each other by using the photo-alignment layer as the alignment layer 26.

As a result, suitably, the metasurface member and the interlayer can be disposed in contact with each other, and the interlayer and the liquid crystal film can be disposed in contact with each other.

In the electromagnetic wave control element of the embodiment of the present invention described above, the interlayer (the bonding layer 16 and the alignment layer 26) is in direct contact with the liquid crystal layer 14 and the metasurface structure 18, but the present invention is not limited thereto.

That is, the electromagnetic wave control element of the embodiment of the present invention can use various layer configurations as long as the metasurface member including the metasurface structure and the interlayer are disposed in contact with each other, and the interlayer and the liquid crystal film including the liquid crystal layer 14 are disposed in contact with each other.

For example, in a configuration in which the alignment layer 26 is used as the interlayer, the metasurface member may have an alignment layer forming film for forming the alignment layer 26. One example thereof is conceptually shown in FIG. 5.

The electromagnetic wave control element shown in FIG. 5 has the alignment layer forming film 32 that covers a surface of the metasurface structure 18, and the alignment layer 26 as the interlayer is formed on a surface of the alignment layer forming film 32. That is, in the present example, the metasurface member is composed of the support body 20, the metasurface structure 18, and the alignment layer forming film 32.

As the alignment layer forming film 32, various known films (sheet-like materials) can be used as long as the films have a necessary transmittance for electromagnetic waves and the alignment layer 26 can be formed on a surface of the film. The alignment layer forming film 32 is preferably a film consisting of a material that can be formed by a coating method from the viewpoint that the entire surface can be closely attached, as in the above-described alignment layer 26.

Specific examples of the material for forming the alignment layer forming film 32 include a polyvinyl alcohol (PVA), a polyimide, an azo-based photo-alignment material, a cinnamoyl-based photo-alignment material, a chalcone-based photo-alignment material, and a stilbene-based photo-alignment material.

The thickness of the alignment layer forming film 32 is not limited, and the thickness with which the alignment layer 26 can be formed may be appropriately set depending on the formation material and the like.

Here, as described above, the thickness of the alignment layer 26 as the interlayer is preferably 50 μm or less, but in a case where the alignment layer 26 is formed on the alignment layer forming film 32, it is preferable that the total thickness of the alignment layer 26 and the alignment layer forming film 32 is 50 μm or less. In addition, the total thickness of the alignment layer 26 and the alignment layer forming film 32 is more preferably 30 μm or less, and still more preferably 10 μm or less.

It is preferable that the total thickness of the alignment layer 26 and the alignment layer forming film 32 is 50 μm or less from the viewpoint that the reflectivity of electromagnetic waves can be improved by more suitably suppressing a variation in the reflectivity of electromagnetic waves in the plane.

In the example above, the reflective layer 24 is provided on a side of the metasurface member opposite to the interlayer, but the present invention is not limited thereto.

That is, in the electromagnetic wave control element of the embodiment of the present invention, the reflective layer 24 may be provided on a side of the liquid crystal film opposite to the interlayer. One example thereof is conceptually shown in FIG. 6.

Figure 6:
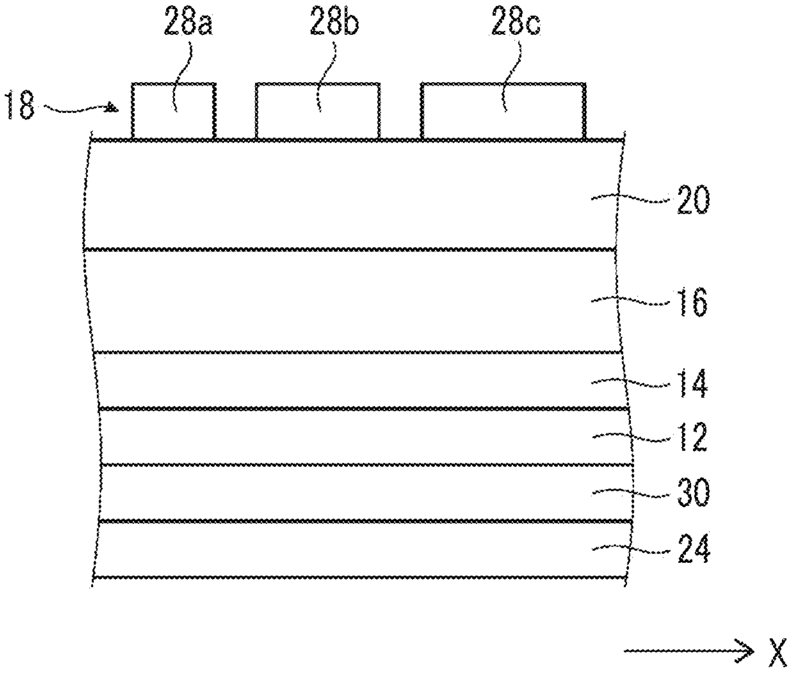
FIG. 6 is a view conceptually showing another example of the electromagnetic wave control element of the embodiment of the present invention.

The electromagnetic wave control element shown in FIG. 6 has a configuration in which a metasurface member having a support body 20 and a metasurface structure 18, and a liquid crystal film having a liquid crystal layer support body 30, an alignment layer 12, and a liquid crystal layer 14 are bonded to each other through a bonding layer 16, with the support body 20 of the metasurface member and the liquid crystal layer 14 of the liquid crystal film facing each other.

In the electromagnetic wave control element shown in FIG. 6, the reflective layer 24 is provided on a side of the liquid crystal layer support body 30 of the liquid crystal film opposite to the alignment layer 12.

Accordingly, in the present example, the electromagnetic waves are incident from the metasurface structure 18 to be phase-modulated by the metasurface structure 18 and the liquid crystal layer 14, and thus incident on the reflective layer 24 and reflected by the reflective layer 24, and the electromagnetic waves are further phase-modulated by the liquid crystal layer 14 and the metasurface structure 18 and thus emitted from the metasurface structure 18 as reflected electromagnetic waves.

Figure 7:
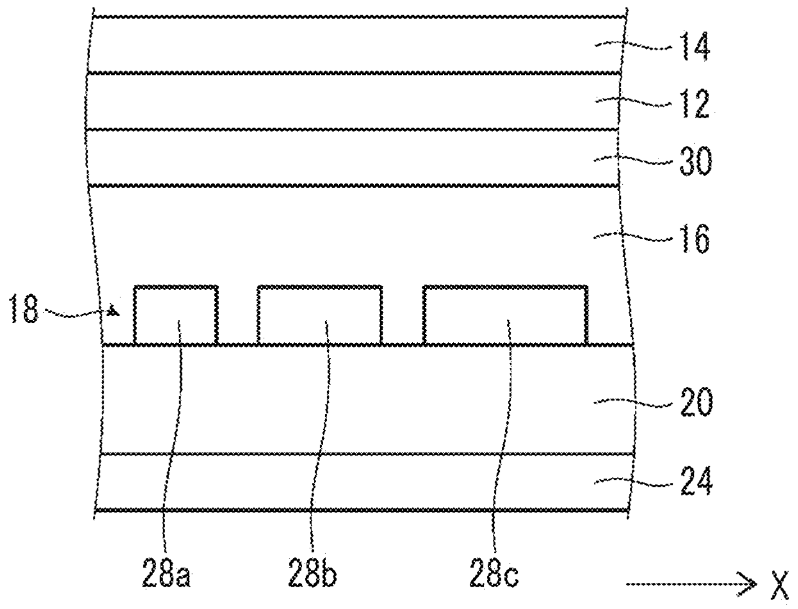
FIG. 7 is a view conceptually showing another example of the electromagnetic wave control element of the embodiment of the present invention.
Figure 8:
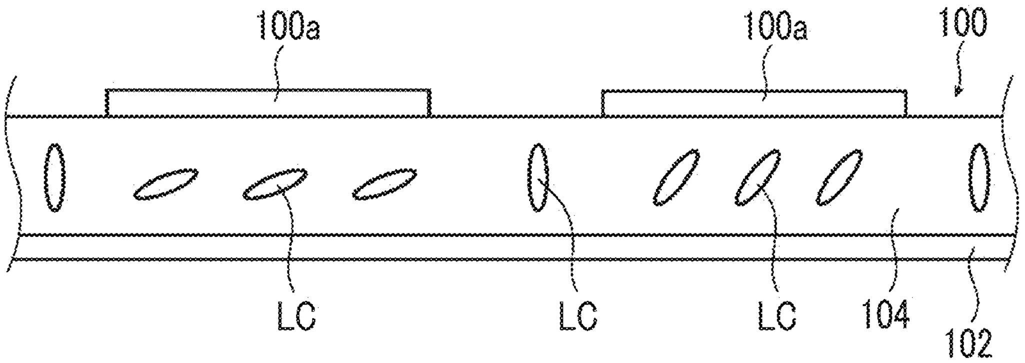
FIG. 8 is a view conceptually showing an example of an electromagnetic wave control element in the related art.

FIG. 7 conceptually shows another example.

The electromagnetic wave control element shown in FIG. 7 has a liquid crystal film having a liquid crystal layer 14, an alignment layer 12, and a liquid crystal layer support body 30, and a metasurface member having a support body 20 and a metasurface structure 18, with a reflective layer 24 being formed on a side of the support body 20 opposite to the metasurface structure 18.

This electromagnetic wave control element has a configuration in which the liquid crystal layer support body 30 of the liquid crystal film and the metasurface structure 18 of the metasurface member face each other and are bonded to each other through the bonding layer 16.

The polarized light state (polarized wave state) of the electromagnetic waves, which are targeted by the electromagnetic wave control element of the embodiment of the present invention, is not limited, and may be unpolarized light, linearly polarized light, circularly polarized light, or elliptically polarized light.

Furthermore, in a case where the electromagnetic waves are linearly polarized light and the microstructures are two-dimensionally arranged in the X direction and the Y direction orthogonal to each other, it is preferable that the electromagnetic waves are incident such that the polarization direction of the electromagnetic waves coincides with the X direction and the Y direction.

Hereinbefore, the electromagnetic wave control element of the embodiment of the present invention has been described in detail, but the present invention is not limited to the above-described examples, and various improvements and changes can be made without departing from the spirit of the present invention.

EXAMPLES

Hereinafter, the characteristics of the present invention will be described in detail with reference to Examples.

Furthermore, it should be noted that the following examples each show an example of the present invention. Accordingly, the scope of the present invention should not be construed as being limited by the specific examples given below.

Example 1

<Creation of Metasurface Member>

A COP film was manufactured as a support body by the method described in JP4991170B. The thickness of the support body (COP film) was 40 μm.

Next, the manufactured support body was cut out into a square shape of 4×4 cm. The surface of the cut support body was subjected to ultrasonic cleaning (45 kHz), and then the support body was placed at a position to be formed with a film inside a sputtering film formation device. After reducing the pressure inside the device, an argon gas was introduced, and sputtering was performed using Cu as a target to form a copper layer having a thickness of 200 μm on a surface of the support body.

By sequentially forming the copper layer on one surface of the support body at a time, a copper layer having a thickness of 200 nm was formed on both surfaces.

Next, the photosensitive transfer member (negative tone transfer material 1) described in JP2020-204757A was unwound and one cover film was peeled from the photosensitive transfer member.

Next, the photosensitive transfer member and one surface (copper layer) of the support body on which the copper layer had been formed on both surfaces were bonded to each other such that the photosensitive resin layer exposed by the peeling of the cover film and the copper layer were in contact with each other, thereby obtaining a laminate. This bonding step was performed under conditions of a roll temperature of 100° C., a linear pressure of 1.0 MPa, and a linear velocity of 4.0 m/min.

A photo mask corresponding to the metasurface structure shown in FIG. 2, in which small-, medium-, and large-sized square microstructures are repeatedly arranged in this order in the X direction and the same microstructure is arranged in the Y direction orthogonal to the X direction, was prepared.

The obtained laminate was irradiated from the cover film of the photosensitive transfer member with light using an ultra-high pressure mercury lamp (exposure main wavelength: 365 nm) through a photo mask thereof at 100 mJ/cm$^2$ to expose the photosensitive resin layer.

The length of one side of the square region P1 was set to 1,041 μm.

The small-sized microstructure was a square having a length of one side of 400 μm, the medium-sized microstructure was a square having a length of one side of 820 μm, and the large-sized microstructure was a square having a length of one side of 935 μm.

Accordingly, the photo mask was formed such that the openings in this size were arranged in the X direction and the Y direction corresponding to the center of the region P1.

After exposing the photosensitive transfer member, the photo mask was removed to peel the cover film from the photosensitive transfer member.

Next, shower development was performed for 30 seconds using 1.0% by mass of an aqueous sodium carbonate solution at a liquid temperature of 25° C. to form a resist pattern consisting of the photosensitive transfer member on the copper layer.

The laminate where the resist pattern was formed was subjected to copper etching with a copper etchant (Cu-02, manufactured by Kanto Chemical Co., Inc.) at 23° C. for 30 seconds.

Thereafter, the resist pattern was peeled using propylene glycol monomethyl ether acetate to form a metasurface structure.

Thus, a metasurface member consisting of a support body and a metasurface structure, in which a reflective layer was formed on one surface of the support body, as shown in FIGS. 1 and 2, was manufactured.

That is, the metasurface member has, on one surface of a support body (COP film) having a thickness of 40 μm, a metasurface structure in which a square region P1 having a length of one side of 1,041 μm is set in a square lattice shape in the X direction and the Y direction, and a square plate-like microstructure having a thickness of 200 nm and a length of one side of 400 μm, a square plate-like microstructure having a thickness of 200 nm and a length of one side of 820 μm, and a square plate-like microstructure having a thickness of 200 nm and a length of one side of 935 μm are repeatedly arranged in this order at the center of the square region P1 in the X direction and the same resonators are arranged in the Y direction.

In addition, the other surface of the support body (COP film) has a copper layer serving as a reflective layer.

<Manufacture of Liquid Crystal Film>

As a liquid crystal layer support body, a cellulose acylate film (thickness: 60 μm, manufactured by FUJIFILM Corporation, TG60) was prepared.

The following composition 1 for forming an alignment layer was applied to a surface of the liquid crystal layer support body using a wire bar.

The liquid crystal layer support body on which the coating film was formed was dried with hot air at 60° C. for 60 seconds, and further dried with hot air at 100° C. for 120 seconds to form an alignment layer.

Next, a rubbing treatment (rotation speed of a roller: 1,000 rotations/1.8 mm spacer thickness, stage speed: 1.8 m/min) was carried out once to obtain a film with an alignment layer. The film thickness of the alignment layer was 100 nm.

| <Composition 1 for Forming Alignment Layer> | |
|---|---|
| Modified polyvinyl alcohol PVA-1 | 3.80 parts by mass |
| IRGACURE 2959 | 0.20 parts by mass |
| Water | 70.00 parts by mass |
| Methanol | 30.00 parts by mass |

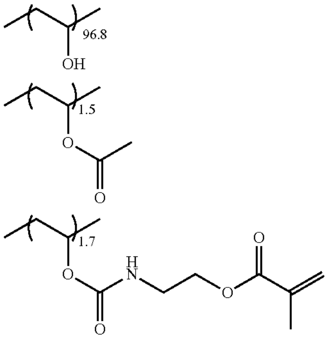

PVA-1

The following liquid crystal composition was continuously applied to the formed alignment layer with a wire bar.

The coating film was heated on a hot plate at 80° C. and then irradiated with ultraviolet rays having a wavelength of 365 nm at an irradiation dose of 300 $mJ/cm^2$ using a high pressure mercury lamp in a nitrogen atmosphere, thereby immobilizing a result, the alignment of the liquid crystal compound.

This liquid crystal immobilized layer was applied multiple times, and was heated and cured with ultraviolet rays under the same conditions as described above to manufacture a laminated film in which a liquid crystal layer having a film thickness of 500 μm was formed.

| Liquid crystal composition | |
|---|---|
| Liquid crystal compound L-1 | 100.00 parts by mass |
| Polymerization initiator (Irgacure OXE01, manufactured by BASF SE) | 1.00 part by mass |
| Leveling agent T-1 | 0.08 parts by mass |
| Methyl ethyl ketone | 1,050.00 parts by mass |

Liquid crystal compound L-1

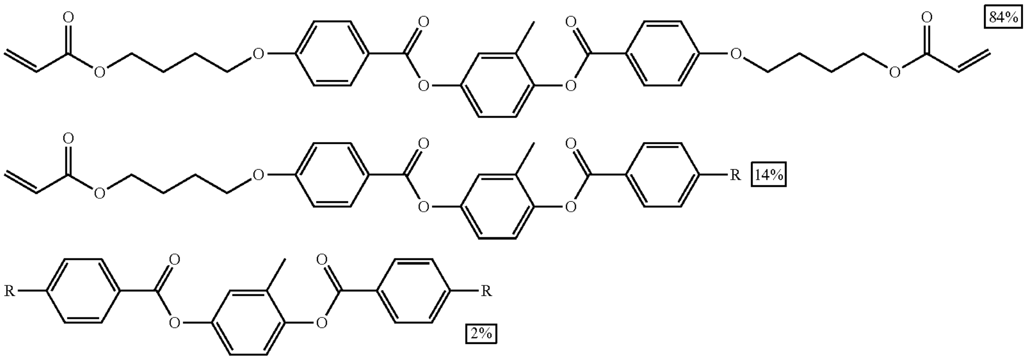

-continued

Liquid crystal composition

R:
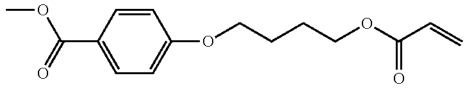

Leveling agent T-1
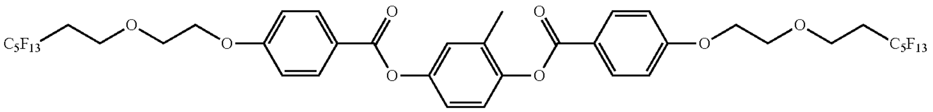

<Manufacture of Electromagnetic Wave Control Element>

The manufactured metasurface member and the laminated film were bonded to each other through a pressure sensitive adhesive layer (manufactured by LINTEC Corporation, NCF-F619, refractive index: about 1.47) having a thickness of 15 μm serving as an interlayer, with the metasurface structure and the liquid crystal layer facing each other.

Thereafter, the liquid crystal layer support body (cellulose acylate film) was peeled from the laminated film to manufacture an electromagnetic wave control element as shown in FIG. 1.

Example 2

A laminated film was manufactured in the same manner as in Example 1, except that the following composition 2 for forming an alignment layer was used instead of the composition 1 for forming an alignment layer in the manufacture of the laminated film of Example 1.

| Composition 2 for forming alignment layer | |
|---|---|
| Polyvinyl alcohol PVA-2 | 3.80 parts by mass |
| IRGACURE 2959 | 0.20 parts by mass |
| Water | 70.00 parts by mass |
| Methanol | 30.00 parts by mass |

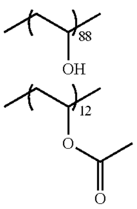

PVA-2

Using this laminated film and a metasurface member which is the same as in Example 1, the laminated film and the metasurface member were bonded to each other in the same manner as in Example 1, with the liquid crystal layer and the metasurface structure facing each other.

Thereafter, the liquid crystal layer support body and the alignment layer were peeled from the laminated film to manufacture an electromagnetic wave control element as shown in FIG. 1, except that an alignment layer was not provided on the surface.

Furthermore, the metasurface structure optimizes the size of the microstructure in accordance with the configuration of the electromagnetic wave control element.

In addition, unless otherwise noted, a reflective layer is provided on a surface of the support body of the metasurface member opposite to the metasurface structure, as in Example 1.

The same applies to other examples with respect to the points above.

Example 3

An electromagnetic wave control element as shown in FIG. 1 was manufactured in the same manner as in Example 1, except that the pressure sensitive adhesive layer (manufactured by LINTEC Corporation, NCF-F619) having a thickness of 15 μm was changed to an ultraviolet curable adhesive (manufactured by Toagosei Co., Ltd., ARONIX UVX-6282, refractive index: about 1.48) serving as an interlayer.

The thickness of the bonding layer was 5 μm.

Example 4

An electromagnetic wave control element as shown in FIG. 1 was manufactured in the same manner as in Example 1, except that the pressure sensitive adhesive layer (manufactured by LINTEC Corporation, NCF-F619) having a thickness of 15 μm was changed to two pressure sensitive adhesive layers (manufactured by LINTEC Corporation, NCF-F619, refractive index: about 1.47) having a thickness of 30 μm as an interlayer.

Accordingly, in the present example, the thickness of the bonding layer (interlayer) is 60 μm.

Example 5

A COP film was manufactured as a liquid crystal layer support body by the method described in JP4991170B. The thickness of the liquid crystal layer support body was 40 μm.

A laminated film was manufactured by forming an alignment layer on a surface of the liquid crystal layer support body in the same manner as in Example 1, and further forming a liquid crystal layer on the alignment layer in the same manner as in Example 1.

Using this laminated film as a liquid crystal film, the liquid crystal film and a metasurface member which was the same as in Example 1 were bonded to each other in the same manner as in Example 1, with the liquid crystal layer support body (COP film) and the metasurface structure facing each other. Thus, an electromagnetic wave control element as shown in FIG. 7 was manufactured.

Example 6

41.6 parts by mass of butoxyethanol, 41.6 parts by mass of dipropylene glycol monomethyl, and 15.8 parts by mass of pure water were added to 1 part by mass of a photo-alignment material E-1 having the following structure, and the obtained solution was filtered under pressure through a 0.45 μm membrane filter to prepare a coating solution for a photo-alignment layer.

E-1

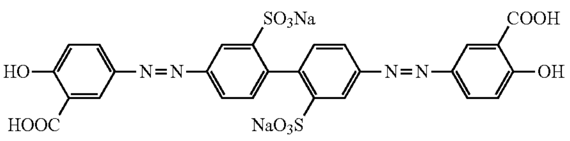

The above-described composition 1 for forming an alignment layer was applied to a surface of the metasurface structure of a metasurface member which was the same as in Example 1 such that the film thickness was 500 nm, dried with hot air at 60° C. for 60 seconds, and further dried with hot air at 100° C. for 120 seconds, thereby forming an alignment layer forming film.

Next, the prepared coating solution for a photo-alignment layer was applied to the alignment layer forming film and dried at 60° C. for 1 minute. The obtained coating film (film thickness: 50 nm) was irradiated with linearly polarized ultraviolet rays (illuminance: 4.5 mW/cm$^2$, integrated irradiation amount: 300 mJ/cm$^2$) using a polarized ultraviolet exposure device to form an alignment layer (photo-alignment layer, refractive index: about 1.52) having an alignment restriction force in the horizontal direction as an interlayer.

A liquid crystal layer having a thickness of 500 μm was formed on a surface of the formed alignment layer in the same manner as in Example 1, thereby manufacturing an electromagnetic wave control element as shown in FIG. 5.

Example 7

The following composition 3 for forming an alignment layer was applied to a surface of the metasurface structure of a metasurface member which was the same as in Example 1 such that the film thickness was 500 nm.

| Composition 3 for Forming Alignment Layer | |
|---|---|
| The following polymer E-2 | 100.00 parts by mass |
| Acid generator PAG-1 | 12.00 parts by mass |
| N,N-diisopropylethylamine (DIPEA) | 0.6 parts by mass |
| Methyl ethyl ketone | 665.00 parts by mass |
| Butyl acetate | 166.00 parts by mass |

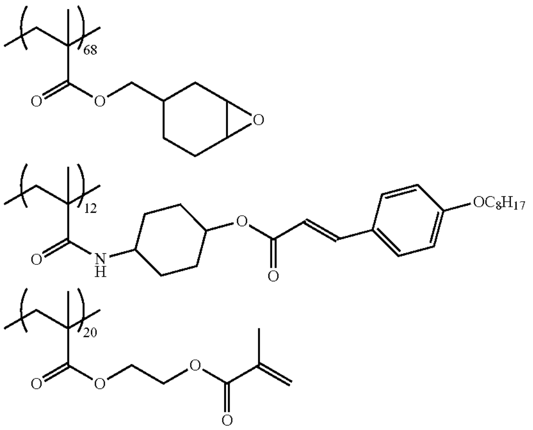

E-2

-continued

Composition 3 for Forming Alignment Layer

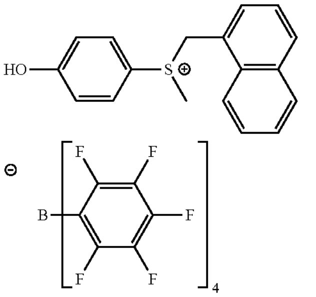

PAG-1

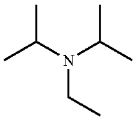

DIPEA

The composition 3 for forming an alignment layer was dried at 100° C. The dried coating film was irradiated with polarized ultraviolet rays (10 mJ/cm$^2$, using an ultra-high pressure mercury lamp) to form an alignment layer (photo-alignment layer, refractive index of about 1.51) having an alignment restriction force in the horizontal direction as an interlayer.

A liquid crystal layer having a thickness of 500 μm was formed on a surface of the formed alignment layer in the same manner as in Example 1, thereby manufacturing an electromagnetic wave control element as shown in FIG. 4.

Example 8

A COP film was manufactured as a liquid crystal layer support body by the method described in JP4991170B. The thickness of the liquid crystal layer support body was 40 μm.

A laminated film was manufactured by forming an alignment layer on a surface of the liquid crystal layer support body in the same manner as in Example 1, and further forming a liquid crystal layer on the alignment layer in the same manner as in Example 1.

Using this laminated film as a liquid crystal film, the liquid crystal film and a metasurface member which was the same as in Example 1 were bonded to each other in the same manner as in Example 1, with the liquid crystal layer and the metasurface structure facing each other. Thus, an electromagnetic wave control element having the same configuration as in FIG. 1, except that a liquid crystal layer support body (COP film) was provided on the surface, was manufactured.

Example 9

In Example 1, the electromagnetic wave control element was obtained using the laminated film as the liquid crystal film while not peeling the liquid crystal layer support body (cellulose acylate film) from the laminated film.

Example 10

As a liquid crystal layer support body, a cellulose acylate film (thickness: 60 μm, manufactured by FUJIFILM Corporation, TG60) was prepared.

The composition 1 for forming an alignment layer was applied to a surface of the liquid crystal layer support body using a wire bar.

The liquid crystal layer support body on which the coating film was formed was dried with hot air at 60° C. for 60 seconds, and further dried with hot air at 100° C. for 120 seconds to form a PVA film. The thickness of the PVA film was 500 nm.

The coating solution for a photo-alignment layer used in Example 6 was applied to a surface of the PVA film and dried at 60° C. for 1 minute to form a photo-alignment layer. The thickness of the photo-alignment layer was 50 nm.

A laminate having the manufactured photo-alignment layer was cut into a size of 4×4 cm.

On the other hand, a stripe-like mask where a transmission unit having a width of 347 μm and a light shielding unit having a width of 2,776 μm were alternately formed was prepared. In this mask, the arrangement direction of the stripes corresponds to the X direction of the metasurface structure and the longitudinal direction of the stripes corresponds to the Y direction of the metasurface structure.

The photo-alignment layer was covered with a mask such that an end part of the transmission unit in the width direction matched one end side of the photo-alignment layer and the transmission unit was located in the plane of the photo-alignment layer. Next, the photo-alignment layer was irradiated with ultraviolet rays using a wire grid polarizer (manufactured by Moxtek, Inc., ProFlux PPL02) installed so that the angle of the absorption axis was 0° (=region Φ1) using an ultraviolet exposure device. For the ultraviolet rays, the illuminance was 4.5 $mW/cm^2$ and the integrated irradiation amount was 300 $mJ/cm^2$.

Furthermore, the angle of the absorption axis is an angle with respect to the width direction of the stripe, and is positive clockwise. That is, the angle of the absorption axis being 0° represents a state where the angle of the absorption axis matches with the width direction (X direction) of the stripe. In addition, the angle of the absorption axis being 90° represents a state where the angle of the absorption axis matches with the longitudinal direction (Y direction) of the stripe.

Next, after moving the mask in the width direction of the stripe by 347 μm and rotating the wire grid polarizer such that the angle of the absorption axis was 16° (=region Φ2), the photo-alignment layer was irradiated with linearly polarized ultraviolet rays in the same manner as above. Next, after moving the mask in the width direction of the stripe by 347 μm and rotating the wire grid polarizer such that the angle of the absorption axis was 86° (=region Φ3), the photo-alignment layer was irradiated with linearly polarized ultraviolet rays in the same manner as above.

The movement of the mask and the irradiation of the photo-alignment layer with ultraviolet rays were performed up to the region Φ4, the region Φ5, . . . , and the region Φ9 by changing the angle of the absorption axis of the wire grid polarizer. As a result, a photo-alignment layer having a stripe-like alignment pattern with a width of 347 μm, in which regions Φ1 to Φ9 where the angle of the alignment direction changed were repeated, was manufactured.

Furthermore, the angles of the absorption axes of the wire grid polarizers were set to 0° for the region Φ1, 16° for the region Φ2, 86° for the region Φ3, 86° for the region Φ4, 0° for the region Φ5, 6° for the region Φ6, 68° for the region Φ7, 29° for the region Φ8, and 4° for the region Φ9.

A liquid crystal layer having a thickness of 500 μm was formed on the photo-alignment layer manufactured as described above in the same manner as in Example 1 to manufacture a laminated film.

During the formation of the photo-alignment layer, the angles of the absorption axes of the wire grid polarizer were as described above. Accordingly, the formed liquid crystal layer has a stripe shape with a width of 347 μm, and has a liquid crystal alignment pattern in which the angle of the optical axis of the liquid crystal compound in the stripe is repeated in the arrangement direction of the stripes in the region Φ1 (0°), the region Φ2 (16°), the region Φ3 (86°), the region Φ4 (86°), the region Φ5 (0°), the region Φ6 (6°), the region Φ7 (68°), the region Φ8 (29°), and the region Φ9 (4°).

In addition, using AxoScan (manufactured by Axometrics, Inc.), it was confirmed that the direction of the optical axis (slow axis) of the liquid crystal compound in the stripe had the angles described above.

A metasurface member which was the same as in Example 1 and the manufactured laminated film were bonded to each other in the same manner as in Example 1, with the metasurface structure and the liquid crystal layer facing each other. Furthermore, during the bonding, the metasurface structure and the liquid crystal layer were aligned in the X direction and the Y direction.

Moreover, an electromagnetic wave control element having the same configuration as that in FIG. 1, except that the liquid crystal layer support body (cellulose acylate film), the PVA film, and the photo-alignment layer were peeled from the laminated film and the alignment layer was not provided on the surface, was manufactured.

Example 11

In the same manner as in Example 6, an alignment layer forming film was formed on a surface of the metasurface structure of a metasurface member, and an alignment layer (photo-alignment layer) was formed on a surface of the alignment layer forming film.

This alignment layer was exposed in the same manner as in Example 10 instead of being irradiated with linearly polarized ultraviolet rays, thereby forming a stripe-like alignment pattern.

A liquid crystal layer having a stripe-like liquid crystal alignment pattern, which was the same as in Example 10, was formed by forming a liquid crystal layer on the alignment layer in which the alignment pattern was formed in the same manner as in Example 1, thereby manufacturing an electromagnetic wave control element as shown in FIG. 5.

Example 12

In the formation of the metasurface member of Example 1, a copper layer was formed only on one surface of the support body (COP film), and using this copper layer, a metasurface structure was formed in the same manner as in Example 1, thereby manufacturing a metasurface member.

On the other hand, the same COP film was prepared as the liquid crystal layer support body and a copper layer was formed on one surface in the same manner.

The composition 3 for forming an alignment layer used in Example 7 was applied to a surface of the liquid crystal layer support body on which the copper layer was not formed, such that the film thickness was 500 nm, and dried at 100° C. The dried coating film was irradiated with polarized ultraviolet rays (10 $mJ/cm^2$, using an ultra-high pressure mercury lamp) to form an alignment layer (photo-alignment layer) having an alignment restriction force in a horizontal direction.

A liquid crystal layer having a film thickness of 500 μm was formed on a surface of the formed alignment layer in the same manner as in Example 1, thereby manufacturing a laminated film having a reflective layer on one surface of the liquid crystal layer support body.

Using the manufactured laminated film as a liquid crystal film, the produced metasurface member and the liquid crystal film were bonded to each other through a pressure sensitive adhesive (manufactured by LINTEC Corporation, NCF-F619) having a thickness of 15 μm serving as an interlayer, with the support body and the liquid crystal layer facing each other. Thus, an electromagnetic wave control element which was the same as in FIG. 6 was manufactured.

Comparative Example 1

The same liquid crystal film and metasurface member as those in Example 1 were laminated, with the liquid crystal layer and the metasurface structure facing each other, without using a pressure sensitive adhesive, thereby manufacturing an electromagnetic wave control element.

[Evaluations]

<Measurement of Reflectivity>

The reflectivity and the variation in reflection of the manufactured electromagnetic wave control element were measured by the following method.

Using Impatt Diode (manufactured by Terasense Group Inc.) having a central wavelength of 100 GHz as a light source, in a case where light was incident from the normal direction of the manufactured electromagnetic wave control element and was reflected, the diffraction reflection at a designed angle (73.7°) was imaged using a two-dimensional Sub-THz imaging camera (Tera-1024, manufactured by Terasense Group Inc.).

The integrated value of luminance of all the pixels of the imaging camera was obtained as the reflection intensity in this direction.

The reflection intensities in the −1st (−73.7°), 0th (specular reflection, 0°), and +1st (73.7°) directions were measured and designated as P-1, P0, and P1, respectively.

A ratio (P1/(P-1+P0+P1)) of the reflection in the designed direction (+1st order, 73.7°) was defined as a reflectivity.

In addition, 10 points of a 4 cm square area of the electromagnetic wave control element were measured by the method described above, and the standard deviation of the measurement results was defined as a variation in reflectivity.

The evaluation standard was as follows.

<<Reflectivity>>

A: The reflectivity was 80% or more.

B: The reflectivity was 60% or more and less than 80%.

C: The reflectivity was 50% or more and less than 60%.

D: The reflectivity was less than 50%.

<<Variation>>

A: The variation was less than 20%.

B: The variation is 20% or more.

The results are shown in Table 1 below.

TABLE 1

| | Variation | Reflectivity |
|---|---|---|
| Example 1 | A | B |
| Example 2 | A | B |
| Example 3 | A | B |
| Example 4 | A | C |
| Example 5 | A | C |
| Example 6 | A | B |
| Example 7 | A | B |
| Example 8 | A | B |
| Example 9 | A | B |
| Example 10 | A | A |
| Example 11 | A | A |
| Example 12 | A | B |
| Comparative Example 1 | B | D |

As shown in the table, the electromagnetic wave control element of the embodiment of the present invention, which has the interlayer disposed in contact with the liquid crystal film having a liquid crystal layer and the metasurface member having a metasurface structure, has a small variation in the plane direction of the reflection of electromagnetic waves and a good reflectivity, as compared with Comparative Examples not having the interlayer.

In particular, as shown in Example 1 (pressure sensitive adhesive layer: 15 μm) and Example 4 (pressure sensitive adhesive layer: 60 μm), a more suitable reflectivity can be obtained by setting the thickness of the interlayer to 50 μm or less. In addition, as shown in Examples 10 and 11, a more suitable reflectivity can be obtained by using the liquid crystal layer as the liquid crystal layer having the liquid crystal alignment pattern.

From the results described above, the effects of the present invention are apparent.

The present invention can be suitably used for a reflective plate of electromagnetic waves, a beam steering device, or the like.

EXPLANATION OF REFERENCES

10: electromagnetic wave control element
12: alignment layer
14, 104: liquid crystal layer
16: bonding layer
18, 100: metasurface structure
20: support body
24: reflective layer
**28*a*, 28*b*, 28*c***: microstructure
30: liquid crystal layer support body
32: alignment layer forming film
LC: liquid crystal compound

What is claimed is:

1. An electromagnetic wave control element comprising, in the following order:

a metasurface member including a metasurface structure composed of a plurality of microstructures;

an interlayer disposed in contact with the metasurface member; and a liquid crystal film that is disposed in contact with the interlayer and includes a liquid crystal layer in which an alignment of a liquid crystal compound is immobilized, wherein the interlayer is a bonding layer or an alignment layer.

2. The electromagnetic wave control element according to claim 1, wherein the metasurface structure acts on electromagnetic waves having a frequency of 0.1 to 0.3 THz.

3. The electromagnetic wave control element according to claim 1, wherein a thickness of the interlayer is 50 μm or less.

4. The electromagnetic wave control element according to claim 1, wherein the electromagnetic wave control element has a reflective layer on a side of the metasurface member opposite to the interlayer or on a side of the liquid crystal film opposite to the interlayer.

5. The electromagnetic wave control element according to claim 1, wherein the interlayer and the liquid crystal layer are in contact with each other.

6. The electromagnetic wave control element according to claim 1, wherein the interlayer and the metasurface structure are in contact with each other.

7. The electromagnetic wave control element according to claim 2, wherein a thickness of the interlayer is 50 μm or less.

8. The electromagnetic wave control element according to claim 2, wherein the electromagnetic wave control element has a reflective layer on a side of the metasurface member opposite to the interlayer or on a side of the liquid crystal film opposite to the interlayer.

9. The electromagnetic wave control element according to claim 2, wherein the interlayer and the liquid crystal layer are in contact with each other.

10. The electromagnetic wave control element according to claim 2, wherein the interlayer and the metasurface structure are in contact with each other.

11. The electromagnetic wave control element according to claim 3, wherein the electromagnetic wave control element has a reflective layer on a side of the metasurface member opposite to the interlayer or on a side of the liquid crystal film opposite to the interlayer.

12. The electromagnetic wave control element according to claim 3, wherein the interlayer and the liquid crystal layer are in contact with each other.

13. The electromagnetic wave control element according to claim 3, wherein the interlayer and the metasurface structure are in contact with each other.

14. The electromagnetic wave control element according to claim 4, wherein the interlayer and the liquid crystal layer are in contact with each other.

15. The electromagnetic wave control element according to claim 4, wherein the interlayer and the metasurface structure are in contact with each other.

16. The electromagnetic wave control element according to claim 5, wherein the interlayer and the metasurface structure are in contact with each other.

* * * * *